(12) United States Patent  (10) Patent No.: US 7,738,053 B2
Kubota  (45) Date of Patent: Jun. 15, 2010

(54) BACKLIGHT UNIT AND LIQUID CRYSTAL DISPLAY DEVICE

(75) Inventor: Eigo Kubota, Tokyo (JP)

(73) Assignee: Sony Corporation, Tokyo (JP)

( * ) Notice: Subject to any disclaimer, the term of this patent is extended or adjusted under 35 U.S.C. 154(b) by 164 days.

(21) Appl. No.: 11/894,073

(22) Filed: Aug. 20, 2007

(65) Prior Publication Data

US 2008/0049168 A1  Feb. 28, 2008

(30) Foreign Application Priority Data

Aug. 23, 2006  (JP)  ............................. 2006-227061

(51) Int. Cl.
*G02F 1/13357* (2006.01)
*F21V 8/00* (2006.01)

(52) U.S. Cl. ...................... 349/65; 362/610; 362/615; 362/628

(58) Field of Classification Search ....................... None
See application file for complete search history.

(56) References Cited

U.S. PATENT DOCUMENTS

| 5,359,691 | A * | 10/1994 | Tai et al. ...................... 385/146 |
| 2004/0042233 | A1 * | 3/2004 | Suzuki et al. ................ 362/561 |
| 2005/0001952 | A1 * | 1/2005 | Han et al. ..................... 349/65 |
| 2005/0185421 | A1 * | 8/2005 | Hayakawa ................... 362/612 |
| 2006/0062016 | A1 * | 3/2006 | Dejima et al. ................ 362/600 |
| 2006/0087867 | A1 * | 4/2006 | Kim ............................ 362/619 |
| 2006/0104091 | A1 * | 5/2006 | Chen et al. .................. 362/621 |
| 2006/0262554 | A1 * | 11/2006 | Mok et al. ................... 362/555 |
| 2007/0008739 | A1 * | 1/2007 | Kim et al. ................... 362/612 |
| 2007/0127261 | A1 * | 6/2007 | An et al. ..................... 362/608 |
| 2008/0019150 | A1 * | 1/2008 | Park et al. ................... 362/621 |

FOREIGN PATENT DOCUMENTS

JP  2003-281924  10/2003

* cited by examiner

*Primary Examiner*—Mike Stahl
(74) *Attorney, Agent, or Firm*—Wolf, Greenfield & Sacks, P.C.

(57) ABSTRACT

A backlight unit includes a light-source substrate having mounted thereon a plurality of light-emitting elements emitting illumination light; a light guide plate having a side surface with the light-source substrate attached thereto so as to receive the illumination light from the light-emitting elements, the light guide plate also having a first surface extending substantially perpendicular to the side surface, and a second surface; a reflective sheet attached to the first surface and reflecting the illumination light towards the second surface; and an optical sheet layer attached to the second surface and including a plurality of stacked optical sheets. The side surface has a reflective portion that reflects at least a part of the illumination light. The at least a part of the illumination light to be reflected at the reflective portion is incident on the reflective portion at an incidence angle equal to or above a critical angle.

12 Claims, 7 Drawing Sheets

BACKLIGHT UNIT AND LIQUID CRYSTAL DISPLAY DEVICE

CROSS REFERENCES TO RELATED APPLICATIONS

The present invention contains subject matter related to Japanese Patent Application JP 2006-227061 filed in the Japanese Patent Office on Aug. 23, 2006, the entire contents of which are incorporated herein by reference.

BACKGROUND OF THE INVENTION

1. Field of the Invention

The present invention relates to backlight units that illuminate transmissive liquid crystal panels and to liquid crystal display devices equipped with such backlight units.

2. Description of the Related Art

Liquid crystal display devices optically display, for example, predetermined images by applying voltage to liquid crystal sealed between two transparent substrates. In detail, the application of voltage causes the orientation of the liquid crystal molecules to change, thereby changing the light transmittance. A liquid crystal display device is equipped with a backlight unit that illuminates a transmissive liquid crystal panel included in the device.

A backlight unit is generally equipped with a cold cathode fluorescent lamp (CCFL) or light-emitting diodes (LEDs) as a light source. Because the light crystal itself is not self-active, the backlight unit emits illumination light evenly and stably over the entire surface of the liquid crystal panel from the rear side of the panel so that a predetermined image, for example, can be displayed on the liquid crystal panel.

Figure 15:
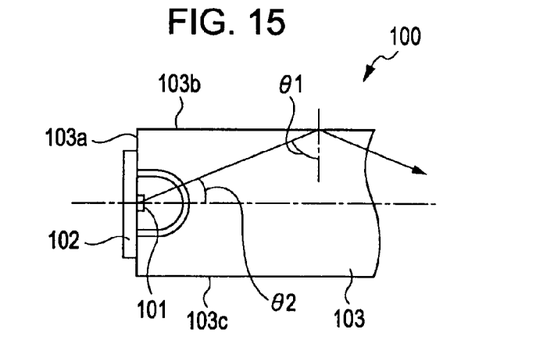
FIG. 15 is a cross-sectional view showing a relevant portion of light-source substrates and a light guide plate included in a backlight unit of related art.

FIG. 15 shows a backlight unit 100 disclosed in Japanese Unexamined Patent Application Publication No. 2003-281924. In this backlight unit 100, a light guide plate 103 has a side surface 103a to which a light-source substrate 102 is attached, and the light-source substrate 102 has mounted thereon a plurality of LEDs 101 as a light source in a substantially single line. The LEDs 101 are used in place of a CCFL since they consume less power, are smaller in size, are lighter in weight, and allow for easier maintenance.

In the backlight unit 100 disclosed in Japanese Unexamined Patent Application Publication No. 2003-281924, illumination light is emitted from the LEDs 101 in a diffusing manner so as to enter the light guide plate 103. The illumination light undergoes total reflection repetitively within the light guide plate 103 so that the illumination light can be widely distributed to the far side of the light guide plate 103. In order for the illumination light to undergo total reflection within the light guide plate 103, it is preferred that an incidence angle θ1 of the illumination light incident on the light guide plate 103 be equal to or above a critical angle.

In this case, an incidence angle θ1 of illumination light refers to an angle formed between a ray of illumination light and a normal line of a boundary surface of the light guide plate 103 at a point where the illumination light in the light guide plate 103 and the boundary surface of the light guide plate 103 intersect.

The critical angle can be determined on the basis of Snell's law.

$$\sin \theta = n_A/n_B (n_B > n_A) \quad \text{Formula 1}$$

where "θ" represents a critical angle, "$n_A$" represents a refractive index of medium A, and "$n_B$" represents a refractive index of medium B.

In the backlight unit 100 disclosed in Japanese Unexamined Patent Application Publication No. 2003-281924, supposing that the light guide plate 103 composed of an acrylic material has a refractive index of about 1.5 and the refractive index of air is about 1.0, the critical angle can be determined to be about 41.8° based on Snell's law. As shown in FIG. 15, regarding illumination light propagating from the acrylic light guide plate 103 to air, the incidence angle θ1 of the illumination light is preferably about 41.8° or higher in order to allow the illumination light to undergo total reflection at the boundary surface of the light guide plate 103.

SUMMARY OF THE INVENTION

Figure 16:
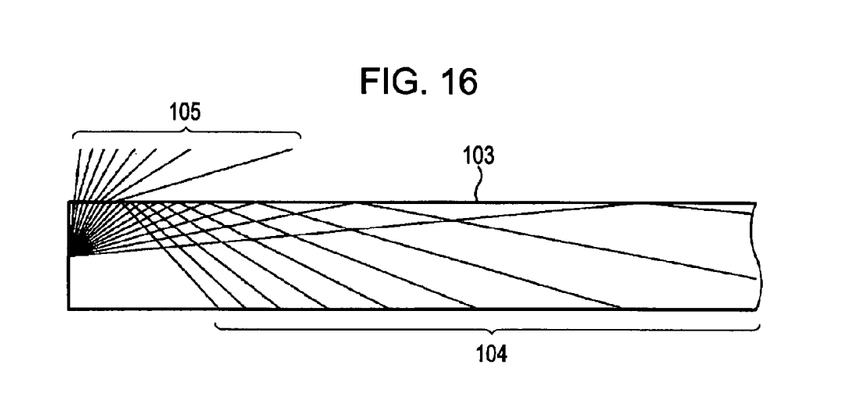
FIG. 16 is a cross-sectional view showing a relevant portion of the light guide plate of the related art and illustrates the condition of illumination light incident on the light guide plate.

An emission angle θ2 of illumination light is an angle between a ray of illumination light in the light guide plate 103 and a central axis of the light guide plate 103. If illumination light has an emission angle θ2 within a range of about −48.2° and 48.2°, the illumination light will have an incidence angle that is equal to or above the critical angle, as shown with lines 104 in FIG. 16. This implies that the illumination light can undergo substantial total reflection repetitively within the light guide plate 103. Thus, the illumination light can be distributed widely over the light guide plate 103 so that the illumination light can reach the far side of the light guide plate 103 without loss. However, illumination light with an emission angle θ2 outside the range of about −48.2° and 48.2° will have an incidence angle that is below the critical angle as shown with lines 105 in FIG. 16. This results in unfavorable transmission of the illumination light through the light guide plate 103.

Specifically, referring to FIG. 15, the light guide plate 103 in the backlight unit 100 disclosed in Japanese Unexamined Patent Application Publication No. 2003-281924 has two principal surfaces 103b and 103c that are substantially parallel to each other. In this light guide plate 103, an incidence angle θ1 of illumination light near the side surface 103a of the light guide plate 103 having the light source attached thereto is below the critical angle. This unfavorably causes the illumination light to be transmitted through the light guide plate 103, which may cause unevenness in brightness, such as bright spots and bright lines that are displayed brighter than the surrounding areas. In the backlight unit of the related art, such unevenness in brightness, i.e. bright spots and bright lines, is prevented by, for example, light absorption or by removing such bright spots and bright lines from the liquid crystal screen frame. For this reason, the transmitted illumination light is wasted and not utilized efficiently.

It is desirable to provide a backlight unit in which illumination light emitted from a light source is efficiently reflected within a light guide plate so that the illumination light can be evenly and stably distributed throughout the light guide plate. It is also desirable to provide a liquid crystal display device equipped with such a backlight unit.

According to an embodiment of the present invention, there is provided a backlight unit that includes a light-source substrate having mounted thereon a plurality of light-emitting elements that emit illumination light; a light guide plate having a side surface with the light-source substrate attached thereto so as to receive the illumination light from the light-emitting elements, the light guide plate also having a first surface extending substantially perpendicular to the side surface, and a second surface; a reflective sheet attached to the first surface of the light guide plate so as to reflect the illumination light from the light-emitting elements towards the second surface of the light guide plate; and an optical sheet layer attached to the second surface of the light guide plate and including a plurality of optical sheets in a stacked manner.

In the backlight unit, the side surface of the light guide plate to which the light-source substrate is attached is provided with a reflective portion that reflects at least a part of the illumination light received by the light guide plate from the light-emitting elements. Moreover, the at least a part of the illumination light to be reflected at the reflective portion is incident on the reflective portion at an incidence angle that is equal to or above a critical angle.

According to another embodiment of the present invention, there is provided a liquid crystal display device that includes a transmissive liquid crystal panel and the aforementioned backlight unit that illuminates the transmissive liquid crystal panel from a rear side of the panel.

Accordingly, since the reflective portion is provided at the side surface of the light guide plate to which the light-source substrate having the light-emitting elements is attached, the incidence angle of illumination light incident on the light guide plate near the light source can be made equal to or above the critical angle. This allows the illumination light to undergo total reflection, thereby preventing the occurrence of unevenness in brightness.

DESCRIPTION OF THE PREFERRED EMBODIMENTS

A backlight unit and a liquid crystal display device according to embodiments of the present invention will be described below with reference to the drawings.

Figure 1:
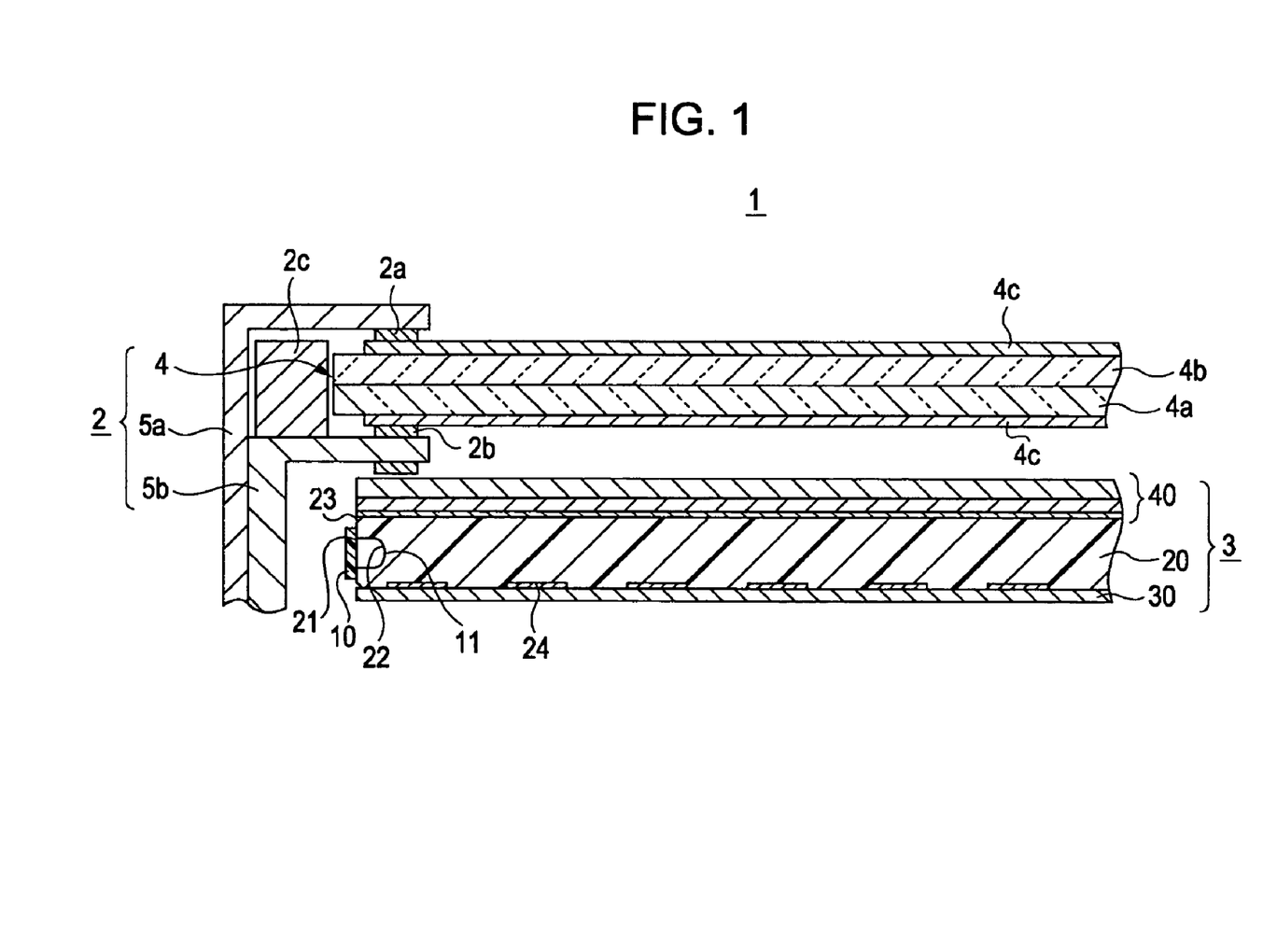
FIG. 1 is a cross-sectional view showing a relevant portion of a liquid crystal display device according to an embodiment of the present invention.

A liquid crystal display device 1 according to an embodiment of the present invention is used in, for example, a display panel for a television receiver. Referring to FIG. 1, the liquid crystal display device 1 includes a liquid crystal panel unit 2 having a transmissive liquid crystal panel 4, and a backlight unit 3 according to an embodiment of the present invention. The backlight unit 3 is combined with the liquid crystal panel unit 2 at a rear side thereof and emits illumination light to the liquid crystal panel unit 2.

The liquid crystal panel unit 2 receiving illumination light of the backlight unit 3 from the rear includes the liquid crystal panel 4 having a substantially rectangular shape, and a front frame member 5a and a rear frame member 5b that support the liquid crystal panel 4.

Referring to FIG. 1, the liquid crystal panel 4 supported by the front frame member 5a and the rear frame member 5b includes a first glass substrate 4a and a second glass substrate 4b that are held facing each other with a certain distance therebetween by, for example, spacer beads. Although not shown, the first glass substrate 4a and the second glass substrate 4b have liquid crystal sealed therebetween. The inner face of the first glass substrate 4a has, for example, stripe-patterned transparent electrodes, an insulating film, and an alignment film for aligning the liquid crystal molecules in a certain direction. The inner face of the second glass substrate 4b has, for example, color filters for the three primary colors of light, an overcoat layer for protecting the color filters, stripe-patterned transparent electrodes, and an alignment film for aligning the liquid crystal molecules in a certain direction.

As described above, in the liquid crystal panel 4, the liquid crystal is sealed between the first glass substrate 4a and the second glass substrate 4b held facing each other with a certain distance therebetween by the spacer beads. When voltage is applied to the transparent electrodes, the alignment films composed of polyimide align the liquid crystal molecules horizontally with respect to the interface so as to change the orientation of the liquid crystal molecules, thereby changing the light transmittance. In the liquid crystal panel 4, the wavelength characteristics of the illumination light emitted from the backlight unit 3 are achromatized so that the illumination light is whitened. The color filters colorize the illumination light so that a predetermined image, for example, can be displayed in full color.

The configuration of the liquid crystal panel 4 is not limited to that described above. The liquid crystal panel 4 may have other various configurations as provided in related art.

Each of the front frame member 5a and the rear frame member 5b for supporting the liquid crystal panel 4 is in a form of a frame. As shown in FIG. 1, the front frame member 5a and the rear frame member 5b support the liquid crystal panel 4 by clamping an outer edge area of the liquid crystal panel 4 from opposite sides through spacers 2a, 2b and a guide member 2c.

The backlight unit 3 is combined with the liquid crystal panel unit 2 at the rear side thereof. The backlight unit 3 emits illumination light to the liquid crystal panel unit 2 so that a predetermined image, for example, can be displayed thereon in color. The liquid crystal display device 1 according to the embodiment of the present invention is equipped with the backlight unit 3 according to the embodiment of the present invention to be described below at the rear side of the device 1. The backlight unit 3 emits illumination light evenly and stably over the entire surface of the liquid crystal panel unit 2 so as to reduce, for example, unevenness in brightness and unevenness in color, thereby contributing to enhanced image quality.

Referring to FIG. 1, the backlight unit 3 combined with the liquid crystal panel unit 2 at the rear side thereof to emit illumination light thereto includes a plurality of light-source substrates 10, a light guide plate 20, a reflective sheet 30, and an optical sheet layer 40. Specifically, the light-source substrates 10 have mounted thereon a plurality of light-emitting diodes (LEDs) 11 as a light source for emitting the illumination light. The light guide plate 20 has a side surface 21 to which the plurality of light-source substrates 10 is attached. The reflective sheet 30 is attached to one principal surface of the light guide plate 20 that extends substantially perpendicular to the side surface 21. The optical sheet layer 40 is attached to the other principal surface of the light guide plate 20 and includes a plurality of optical sheets in a stacked manner. The one principal surface and the other principal surface will respectively be referred to as a first principal surface and a second principal surface hereinafter.

As shown in FIG. 1, the light-source substrates 10 having mounted thereon the plurality of LEDs 11 as a light source for emitting the illumination light are glass epoxy substrates or metal core substrates composed of, for example, aluminum, and are in a form of substantially rectangular thin plates. One side of the light-source substrates 10 has the plurality of LEDs 11 mounted thereon, the LEDs 11 being a combination of red LEDs, green LEDs, and blue LEDs arranged in a substantially single line in the longitudinal direction of the light-source substrates 10. The LEDs 11 are covered with respective microlenses 12 on a wiring pattern (not shown).

The light guide plate 20 having the light-source substrates 10 attached to the side surface 21 thereof is composed of a resin material. Preferably, the resin material is a transparent resin material, such as acrylic resin. As shown in FIG. 1, the light guide plate 20 is a substantially rectangular plate having two principal surfaces that are substantially parallel to each other and having a size slightly larger than that of the liquid crystal panel 4.

The light guide plate 20 has a recess 22 in the side surface 21 thereof, reflective portions 23, and light control portions 24. The LEDs 11 mounted on the light-source substrates 10 are fitted within the recess 22 so that illumination light is introduced into the light guide plate 20 through the recess 22. The reflective portions 23 reflect the illumination light introduced into the light guide plate 20 through the recess 22. The light control portions 24 reflect the illumination light subject to total reflection within the light guide plate 20.

Figure 2:
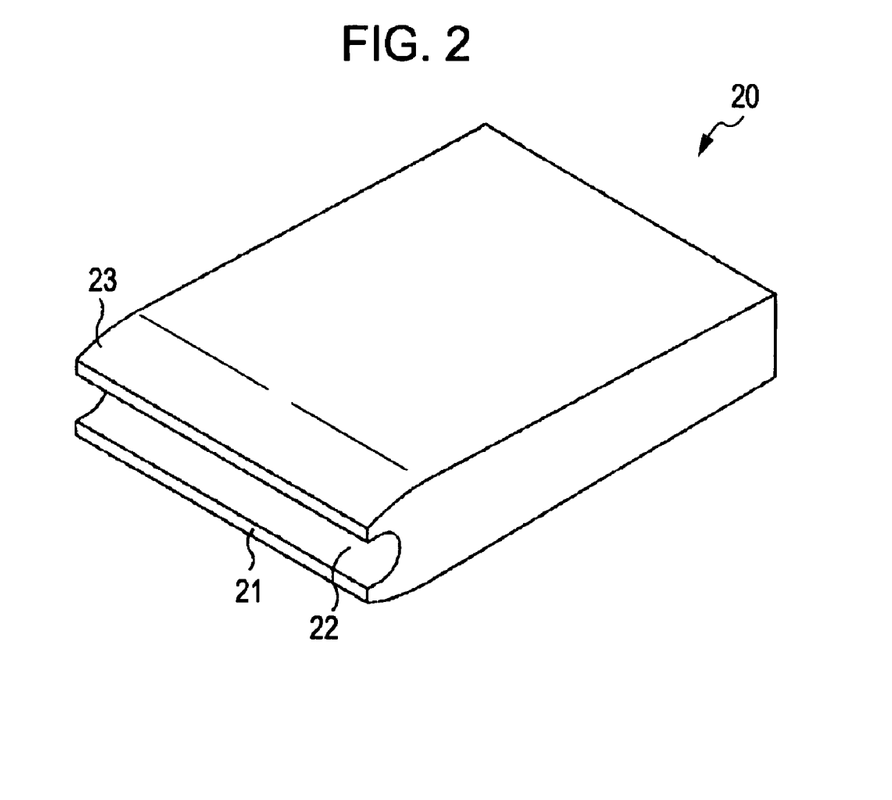
FIG. 2 is a perspective view of a light guide plate.

Referring to FIG. 2, the recess 22 in the side surface 21, in which the LEDs 11 mounted on the light-source substrates 10 are fitted, extends in the longitudinal direction of the side surface 21 and has a cross-sectional shape that is the same as or slightly larger than that of the LEDs 11 so as to cover the LEDs 11 mounted on the light-source substrates 10.

The light-source substrates 10 are, for example, three light-source substrates that are arranged adjacent to each other on the side surface 21 of the light guide plate 20 in the longitudinal direction of the side surface 21. Each of the light-source substrates 10 is attached to the light guide plate 20 by bonding one surface of the light-source substrate 10 having the LEDs 11 to the side surface 21 of the light guide plate 20 using, for example, a double-sided tape (not shown). In this case, referring to FIG. 3, each light-source substrate 10 is attached to the light guide plate 20 such that the LEDs 11 mounted on the one surface of the light-source substrate 10 are accommodated within the recess 22 provided at the position corresponding to the LEDs 11. Although not shown, the light-source substrates 10 are connected to each other with, for example, lead wires.

Figure 3:
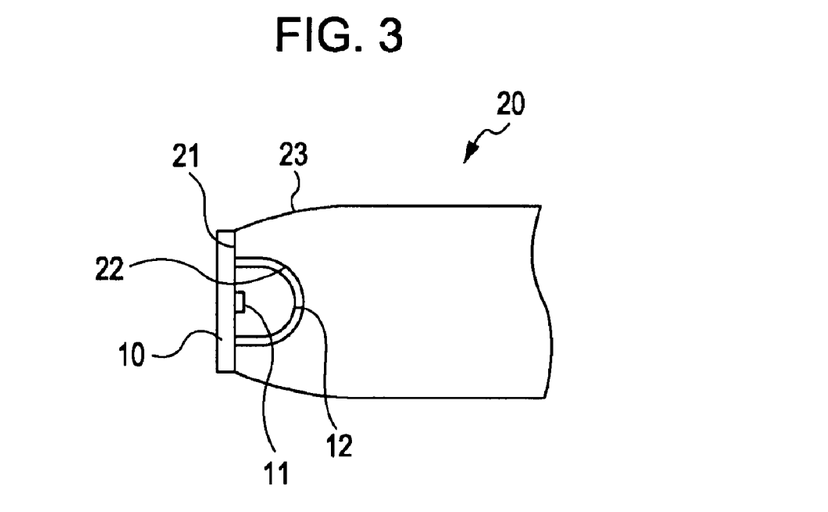
FIG. 3 is a cross-sectional view showing a relevant portion of light-source substrates and the light guide plate.

The recess 22 accommodating the LEDs 11 allow the illumination light emitted from the LEDs 11 to directly enter the light guide plate 20 in a direction perpendicular to the recess 22.

The arrangement and the number of the light-source substrates 10 and the LEDs 11 are appropriately modifiable in accordance with, for example, the size of the light guide plate 20. The light-source substrates 10 may be attached to the light guide plate 20 by a clamping technique, by a snap-fit technique, or by a bonding technique using, for example, an adhesive material.

Referring to FIGS. 2 and 3, the reflective portions 23 that reflect the illumination light introduced into the light guide plate 20 through the recess 22 are defined by curved surfaces extending along the side surface 21. Specifically, these surfaces are formed by curving the edges of the side surface 21 of the light guide plate 20.

As mentioned above, the light guide plate 20 is composed of acrylic resin and has a refractive index of about 1.5. With respect to illumination light propagating from the light guide plate 20 composed of acrylic resin to air, supposing that the refractive index of air is about 1.0, an incidence angle of the illumination light is determined to be about 41.8° or higher based on Snell's law in order to allow the illumination light to undergo total reflection at the boundary surfaces of the light guide plate 20. In this case, the term "incidence angle of illumination light" refers to an angle formed between a ray of illumination light and a normal line of a boundary surface of the light guide plate 20 at a point where the illumination light in the light guide plate 20 and the boundary surface of the light guide plate 20 intersect.

The edges of the curved reflective portions 23 extending along the side surface 21 are located where emission angles of illumination light in the light guide plate 20 with respect to the central axis of the light guide plate 20 intersect with the boundary surfaces of the light guide plate 20 at about −48.2° and 48.2°. This allows the illumination light emitted from the LEDs 11 to undergo total reflection so that the incidence angles of illumination light near the LEDs 11 are equal to or above the critical angle.

Figure 4:
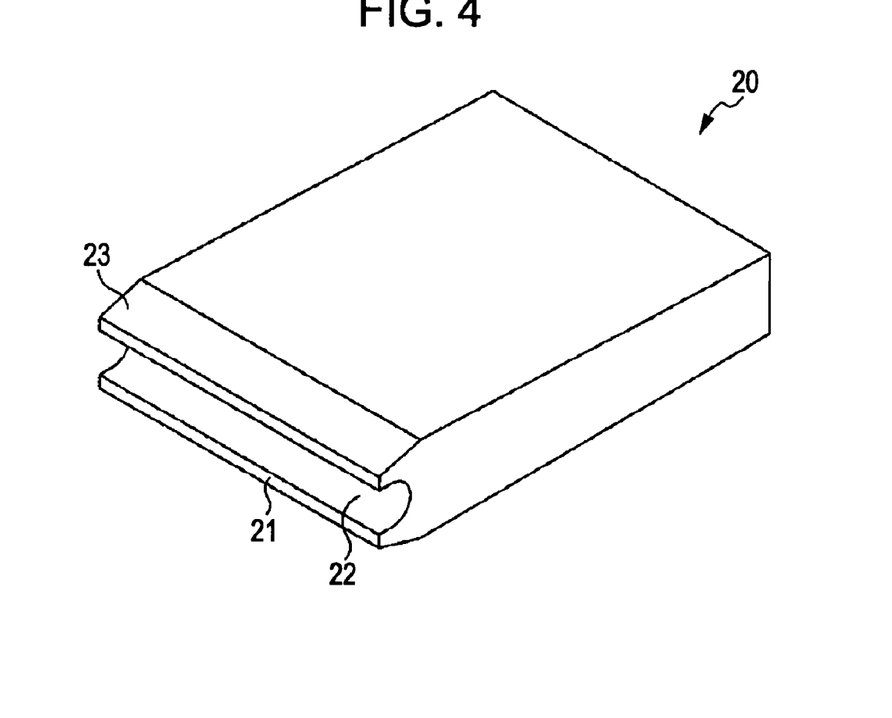
FIG. 4 is a perspective view showing an alternative example of reflective portions of the light guide plate.
Figure 5:
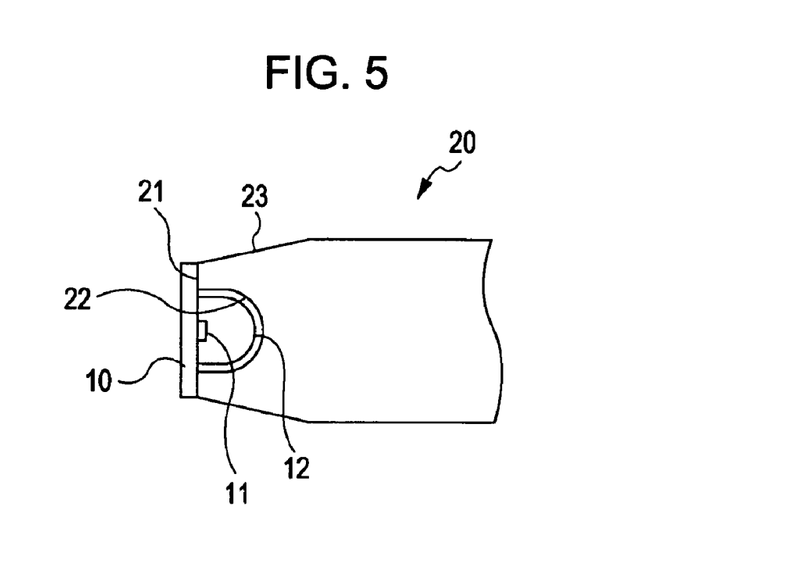
FIG. 5 is a cross-sectional view showing a relevant portion of the light-source substrates and the reflective portions of the light guide plate according to the alternative example.

The reflective portions 23 of the light guide plate 20 do not necessarily have to be defined by curved surfaces. For example, referring to FIGS. 4 and 5, the reflective portions 23 may be defined by flat surfaces. Furthermore, the edges of the reflective portions 23 extending along the side surface 21 of the light guide plate 20 do not necessarily have to be located where the emission angles of illumination light with respect to the central axis of the light guide plate 20 intersect with the boundary surfaces of the light guide plate 20 at about −48.2° and 48.2°. The location of the edges of the reflective portions 23 can be appropriately modified in accordance with a tolerance range for transmission of illumination light through the light guide plate 20.

Referring to FIG. 1, the light control portions 24 that reflect the illumination light subject to total reflection within the light guide plate 20 form a dot pattern on the first principal surface of the light guide plate 20 that extends substantially perpendicular to the side surface 21 having the light-source substrates 10 attached thereto. The light control portions 24 are formed by screen-printing using reflective ink containing a mixture of a light-shielding material or glass powder, such as titanium oxide and barium sulfide, and a diffusing agent, such as silicon oxide. When the illumination light being totally reflected within the light guide plate 20 becomes incident on the regions occupied by the light control portions 24 on the first principal surface of the light guide plate 20, the light control portions 24 diffuse and reflect the illumination light towards the second principal surface of the light guide plate 20.

The light control portions 24 do not necessarily have to be formed by screen-printing. Alternatively, the light control portions 24 may be formed integrally with the light guide plate 20 by injection molding.

When the illumination light within the light guide plate 20 becomes incident on regions not occupied by the light control portions 24 on the first principal surface of the light guide plate 20, if the incidence angle of the illumination light with respect to the first principal surface of the light guide plate 20 is equal to or above the critical angle, the light guide plate 20 reflects the illumination light towards the second principal surface thereof. On the other hand, when the incidence angle of the illumination light with respect to the first principal surface of the light guide plate 20 is below the critical angle, the illumination light is reflected towards the second principal surface of the light guide plate 20 by the reflective sheet 30 attached to the first principal surface of the light guide plate 20.

Furthermore, if the illumination light reflected by the first principal surface of the light guide plate 20 enters the second principal surface thereof at an incidence angle that is equal to or above the critical angle with respect to the second principal surface of the light guide plate 20, the light guide plate 20 reflects the illumination light towards the first principal surface thereof. On the other hand, if the illumination light reflected by the first principal surface of the light guide plate 20 enters the second principal surface thereof at an incidence angle that is below the critical angle with respect to the second principal surface of the light guide plate 20, the light guide plate 20 allows the illumination light to be emitted outward from the second principal surface thereof.

In this manner, the light guide plate 20 allows the illumination light incident on the light guide plate 20 to undergo repetitive reflection so that the brightness of the illumination light can be controlled to be even entirely over the second principal surface of the light guide plate 20.

The light guide plate 20 does not necessarily have to be formed of a transparent resin material, and may be formed of any resin material that has light guiding properties, such as a milk-white resin material. Furthermore, the shape of the light guide plate 20 is not limited to the substantially rectangular shape with the two substantially parallel principal surfaces. For example, the light guide plate 20 may have a shape in which the distance between the principal surfaces gradually decreases or increases towards the side surface opposite to the side surface 21 with the LEDs 11 attached thereto.

Referring to FIG. 1, the reflective sheet 30 attached to the first principal surface of the light guide plate 20 that extends substantially perpendicular to the side surface 21 is a substantially rectangular thin sheet having substantially the same size as that of the first principal surface of the light guide plate 20. The reflective sheet 30 is defined by, for example, an aluminum-plate base material with mechanical rigidity whose surface is coated with a reflective material or provided with a reflective material composed of expandable polyethylene terephthalate (PET) containing a fluorescence agent and having high reflectance properties. The side of the reflective sheet 30 with the reflective material is attached to the light guide plate 20.

Of the illumination light within the light guide plate 20 that is subject to repetitive reflection within the light guide plate 20, the reflective sheet 30 reflects illumination light which is to be transmitted outward from the light guide plate 20 and whose incidence angle is equal to or above the critical angle with respect to the first principal surface of the light guide plate 20 so as to direct the illumination light towards the interior of the light guide plate 20.

In order for illumination light to be utilized efficiently within the light guide plate 20, the reflective sheet 30 may also be attached to the side surfaces of the light guide plate 20. Furthermore, the material used for the reflective sheet 30 is not limited to an aluminum plate. For example, a stainless-steel plate having mirror surfaces may be used as an alternative. Furthermore, if the light guide plate 20 is relatively small in size, the reflective sheet 30 may be formed of a reflective material composed of, for example, expandable PET containing a fluorescence agent.

As described above, the optical sheet layer 40 is attached to the second principal surface of the light guide plate 20 and includes a plurality of optical sheets in a stacked manner. Specifically, referring to FIG. 1, although not limited to the following configuration, the optical sheet layer 40 has a substantially rectangular shape with substantially the same size as that of the second principal surface of the light guide plate 20. The plurality of stacked optical sheets has optical properties and includes, for example, a polarization film that resolve the illumination light emitted from the light source of the light-source substrates 10 and guided towards the liquid crystal panel 4 into polarized components orthogonal to each other, a diffusion film that diffuses the illumination light, and a brightness enhancement film for enhancing the brightness.

As described above with reference to FIG. 1, in the backlight unit 3, the light-source substrates 10 having the LEDs 11 mounted thereon are attached to the side surface 21 of the light guide plate 20 such that the LEDs 11 mounted on the light-source substrates 10 are accommodated within the recess 22 of the light guide plate 20. Consequently, when illumination light is emitted from the LEDs 11 serving as a light source, the illumination light can be directly introduced into the light guide plate 20.

Figure 6:
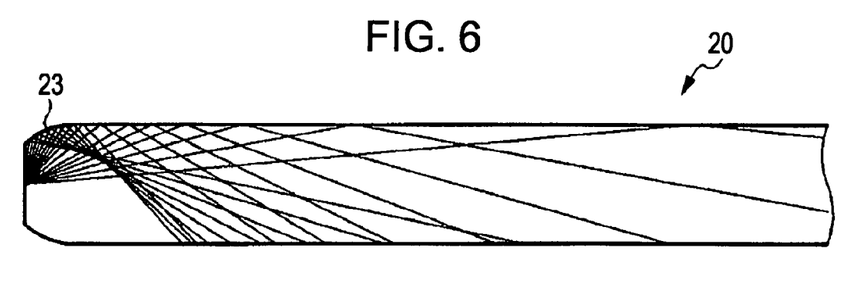
FIG. 6 is a cross-sectional view showing a relevant portion of the light guide plate and illustrates the condition of illumination light incident on the light guide plate.

In addition, the backlight unit 3 has the reflective portions 23 provided along the edges of the side surface 21 of the light guide plate 20 to which the light-source substrates 10 with the LEDs 11 are attached. This prevents illumination light incident on the light guide plate 20 from causing unevenness in brightness in the regions of the light guide plate 20 near the light-source substrates 10. Accordingly, referring to FIG. 6, the incidence angle of the illumination light becomes equal to or above the critical angle, whereby the illumination light can undergo total reflection.

Referring to FIG. 1, in the backlight unit 3, when illumination light within the light guide plate 20 becomes incident on the light control portions 24 provided on the first principal surface of the light guide plate 20, the illumination light is reflected by the light control portions 24 and is repetitively reflected within the light guide plate 20 by, for example, the reflective sheet 30. This allows the illumination light to be distributed evenly throughout the light guide plate 20.

When the illumination light that has undergone repetitive reflection enters the second principal surface of the light guide plate 20 at an incidence angle that is below the critical angle with respect to the second principal surface, the backlight unit 3 allows the illumination light to be output to the optical sheet layer 40.

In the backlight unit 3, the illumination light is given an optical treatment by the optical sheet layer 40, whereby illumination light with even brightness entirely over the second principal surface illuminates the liquid crystal panel 4.

As described above, in the backlight unit 3, the light-source substrates 10 with the LEDs 11 mounted thereon is attached to the side surface 21 of the light guide plate 20 such that the LEDs 11 mounted on the light-source substrates 10 are accommodated within the recess 22 of the light guide plate 20. This structure allows illumination light emitted from the LEDs 11 to enter the light guide plate 20 efficiently without being refracted or reflected.

In addition, the backlight unit 3 has the reflective portions 23 provided along the edges of the side surface 21 of the light guide plate 20 to which the light-source substrates 10 with the LEDs 11 mounted thereon are attached. This allows the incidence angle of illumination light incident on the light guide plate 20 near the LEDs 11 to be equal to or above the critical angle. The illumination light can thus properly undergo total reflection, thereby preventing the occurrence of unevenness in brightness.

Figure 7:
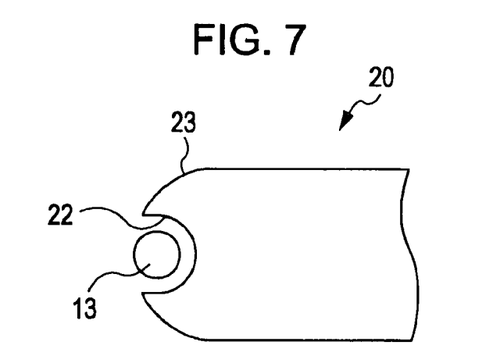
FIG. 7 is a cross-sectional view showing a relevant portion of the light-source substrates and the light guide plate in a case where a cold cathode fluorescent lamp is used as a light source.

The light source in the backlight unit 3 is not limited to LEDs 11, and may alternatively be defined by a cold cathode fluorescent lamp (CCFL) 13 as shown in FIG. 7.

Figure 8:
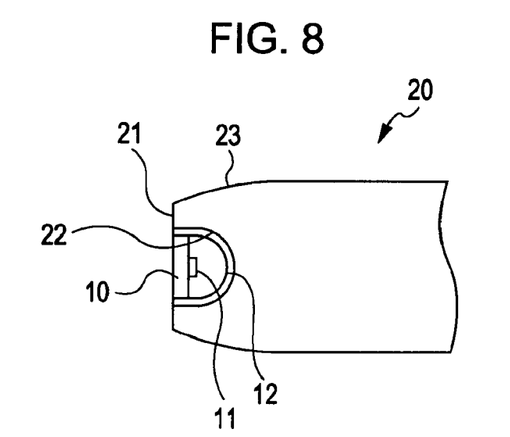
FIG. 8 is a cross-sectional view showing a relevant portion of the light-source substrates and the light guide plate attached to each other by an alternative attachment technique.
Figure 9:
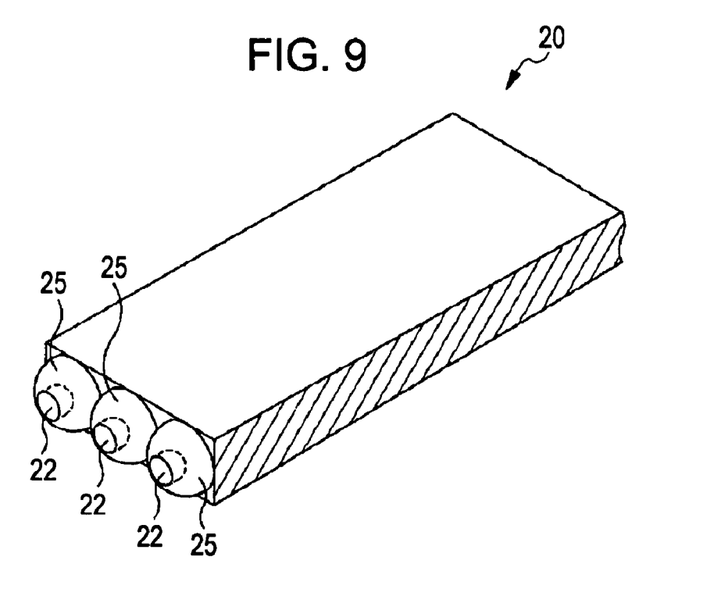
FIG. 9 is a perspective view of a light guide plate according to an alternative example.
Figure 10:
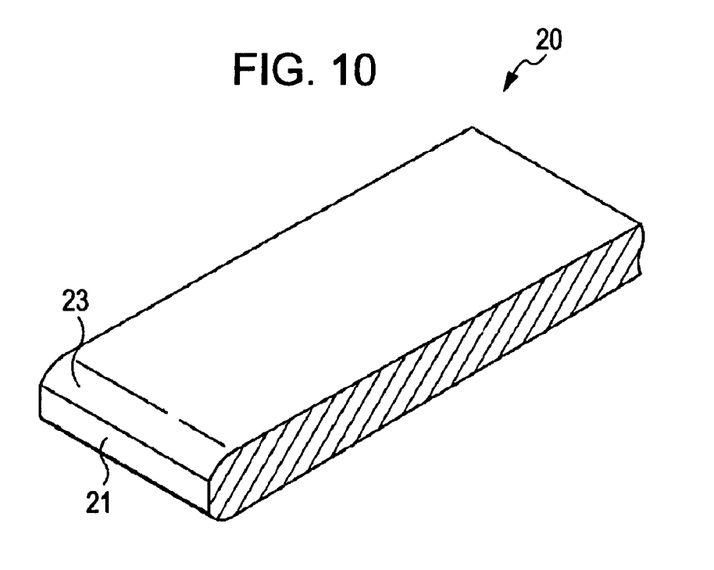
FIG. 10 is a perspective view of a light guide plate according to another alternative example.

In the backlight unit 3, the light-source substrates 10 do not necessarily have to be attached to the side surface 21 of the light guide plate 20 in a manner such that the LEDs 11 are accommodated within the recess 22 of the light guide plate 20. For example, referring to FIG. 8, the light-source substrates 10 may be accommodated within the recess 22 together with the LEDs 11. As another alternative, referring to FIG. 9, the backlight unit 3 may have a plurality of projections 25 on the side surface 21 of the light guide plate 20. Specifically, the projections 25 correspond to the respective LEDs 11 and may have a cross-sectional shape that is substantially the same as the curved shape of the reflective portions 23. These projections 25 may be provided so as to accommodate the LEDs 11 or both the LEDs 11 and the light-source substrates 10. As a further alternative, referring to FIG. 10, the recess 22 of the light guide plate 20 may be omitted from the backlight unit 3. In this case, the LEDs 11 emit illumination light into the light guide plate 20 in a state where the LEDs 11 are not accommodated within the light guide plate 20.

Figure 11:
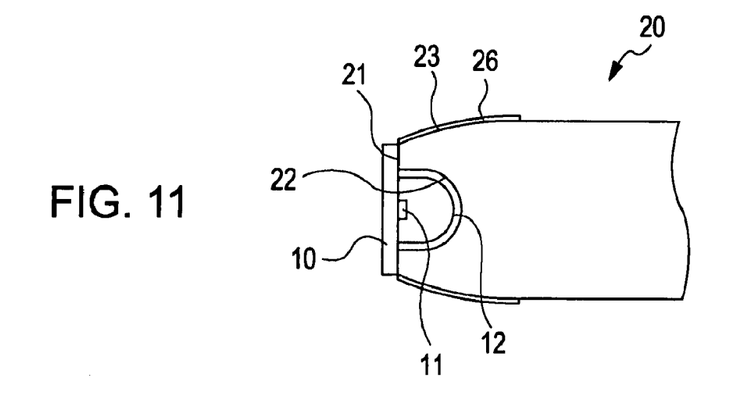
FIG. 11 is a cross-sectional view showing a state where reflective members are attached to the reflective portions of the light guide plate.
Figure 12:
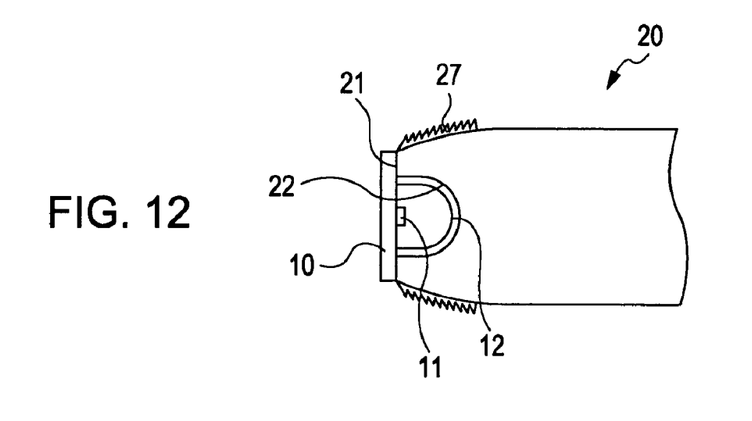
FIG. 12 is a cross-sectional view showing a state where stepped sections are provided on the reflective portions of the light guide plate.

Referring to FIG. 11, in the backlight unit 3, the reflective portions 23 of the light guide plate 20 may alternatively be provided with reflective members 26 having a specular reflection function, such as mirrors, half mirrors, and dichroic mirrors, so that illumination light emitted from the LEDs 11 can be utilized more efficiently. As a further alternative, referring to FIG. 12, the reflective portions 23 of the light guide plate 20 in the backlight unit 3 may be provided with stepped sections 27 defined by, for example, lenticular lenses or Fresnel lenses so that illumination light emitted from the LEDs 11 can be utilized more efficiently.

Figure 13:
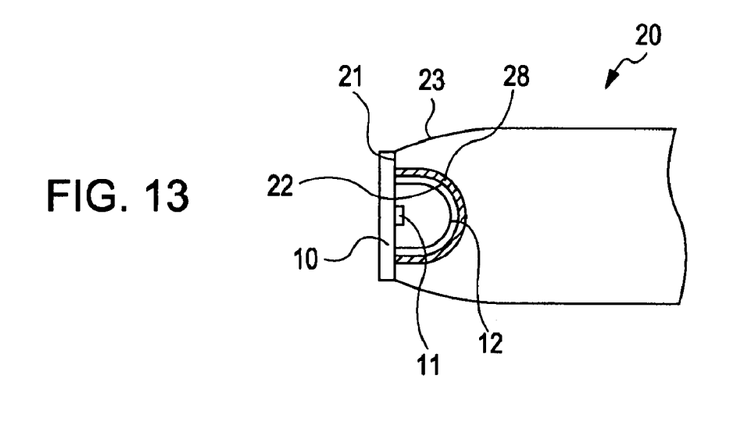
FIG. 13 is a cross-sectional view showing a relevant portion of the light-source substrates and the light guide plate, in which the light guide plate and light-emitting diodes have optically transparent resin provided therebetween.

FIG. 13 illustrates another alternative example in which the recess 22 of the light guide plate 20 and the microlenses 12 for the LEDs 11 have optically transparent resin 28 filled therebetween. The optically transparent resin 28 has a high refractive index and may be, for example, polycarbonate resin, polymethyl-methacrylate resin, acrylic resin, or silicon resin. In this case, the microlenses 12, the optically transparent resin 28, and the light guide plate 20 are given refractive indices that increase in that order. In this manner, the emission angles of illumination light in the light guide plate 20 can be adjusted so that the illumination light emitted from the LEDs 11 can be utilized more efficiently.

Figure 14:
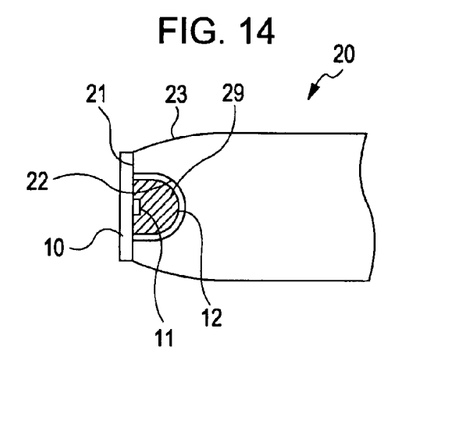
FIG. 14 is a cross-sectional view showing a relevant portion of the light-source substrates and the light guide plate, in which light-emitting diodes have optically transparent resin provided therein.

Furthermore, referring to FIG. 14, each of the microlenses 12 for the LEDs 11 may be filled with optically transparent resin 29 having high refractive index, such as polycarbonate resin, polymethyl-methacrylate resin, acrylic resin, and silicon resin. In this case, the optically transparent resin 29, the microlenses 12, and the light guide plate 20 are given refractive indices that increase in that order. In this manner, the emission angles of illumination light in the light guide plate 20 can be adjusted to smaller angles so that the illumination light emitted from the LEDs 11 can be utilized more efficiently.

It should be understood by those skilled in the art that various modifications, combinations, sub-combinations and alterations may occur depending on design requirements and other factors insofar as they are within the scope of the appended claims or the equivalents thereof.

What is claimed is:

1. A backlight unit comprising:
   a light-source substrate having mounted thereon a plurality of light-emitting elements that emit illumination light;
   a light guide plate having a side surface with the light-source substrate attached thereto so as to receive the illumination light from the light-emitting elements, the light guide plate also having a first surface extending substantially perpendicular to the side surface, and a second surface, wherein the light guide plate has a thickness extending between the first and second surfaces;
   a reflective sheet attached to the first surface of the light guide plate so as to reflect the illumination light from the light-emitting elements towards the second surface of the light guide plate; and
   an optical sheet layer attached to the second surface of the light guide plate and comprising a plurality of optical sheets in a stacked manner,
   wherein the side surface of the light guide plate to which the light-source substrate is attached is provided with a reflective portion that reflects illumination light received by the light guide plate from the light-emitting elements,
   wherein the light guide plate is shaped such that substantially all of the illumination light received by the reflective portion from the light-emitting elements is incident on the reflective portion at an incidence angle that is equal to or above a critical angle, such that the illumination light received by the reflective portion is reflected within the light guide plate;
   wherein the thickness of the light guide plate is gradually reduced approaching the side surface; and
   wherein a first thickness of the light guide plate at the side surface is smaller than a second thickness of the light guide plate at a central region of the light guide plate outside the reflective portion, wherein the reflective portion at the side surface of the light guide plate has a stepped profile.

2. The backlight unit according to claim 1, wherein the reflective portion of the light guide plate has a curved surface or a flat surface.

3. The backlight unit according to claim 1, wherein the light-source substrate is attached to the side surface of the light guide plate in a manner such that the light-emitting elements mounted on the light-source substrate are accommodated in the light guide plate.

4. The backlight unit according to claim 1, wherein the light guide plate contains a transparent resin material.

5. The backlight unit according to claim 1, wherein the reflective portion at the side surface of the light guide plate is provided with a reflective member having a specular reflection function.

6. The backlight unit according to claim 1, wherein the light-emitting elements and the light guide plate have optically transparent resin filled therebetween.

7. A liquid crystal display device comprising:
a transmissive liquid crystal panel; and
a backlight unit that illuminates the transmissive liquid crystal panel from a rear side of the panel,
wherein the backlight unit comprises:
a light-source substrate having mounted thereon a plurality of light-emitting elements that emit illumination light,
a light guide plate having a side surface with the light-source substrate attached thereto so as to receive the illumination light from the light-emitting elements, the light guide plate also having a first surface extending substantially perpendicular to the side surface, and a second surface, wherein the light guide plate has a thickness extending between the first and second surfaces,
a reflective sheet attached to the first surface of the light guide plate so as to reflect the illumination light from the light-emitting elements towards the second surface of the light guide plate, and
an optical sheet layer attached to the second surface of the light guide plate and comprising a plurality of optical sheets in a stacked manner,
wherein the side surface of the light guide plate to which the light-source substrate is attached is provided with a reflective portion that reflects at least some of the illumination light received by the light guide plate from the light-emitting elements,
wherein the light guide plate is shaped such that substantially all of the illumination light received by the reflective portion from the light-emitting elements is incident on the reflective portion at an incidence angle that is equal to or above a critical angle, such that the illumination light received by the reflective portion is reflected within the light guide plate;
wherein the thickness of the light guide plate is gradually reduced approaching the side surface; and
wherein a first thickness of the light guide plate at the side surface is smaller than a second thickness of the light guide plate at a central region of the light guide plate outside the reflective portion, wherein the reflective portion at the side surface of the light guide plate has a stepped profile.

8. The liquid crystal display device according to claim 7, wherein the reflective portion of the light guide plate has a curved surface or a flat surface.

9. The liquid crystal display device according to claim 7, wherein the light-source substrate is attached to the side surface of the light guide plate in a manner such that the light-emitting elements mounted on the light-source substrate are accommodated in the light guide plate.

10. The liquid crystal display device according to claim 7, wherein the light guide plate contains a transparent resin material.

11. The liquid crystal display device according to claim 7, wherein the reflective portion at the side surface of the light guide plate is provided with a reflective member having a specular reflection function.

12. The liquid crystal display device according to claim 7, wherein the light-emitting elements and the light guide plate have optically transparent resin filled therebetween.

* * * * *